(12) United States Patent
Omer et al.

(10) Patent No.: US 10,262,169 B2
(45) Date of Patent: Apr. 16, 2019

(54) SYSTEM AND METHOD, USING COOLERS, FOR READING RADIO FREQUENCY IDENTIFICATION TAGS AND TRANSMITTING DATA WIRELESSLY

(71) Applicant: WasteLess Ltd, Kfar Saba (IL)

(72) Inventors: Oded Omer, Holon (IL); Ben Biron, Kfar Saba (IL); Yossi Regev, Ramat Gan (IL)

(73) Assignee: Wasteless, LTD (IL)

( * ) Notice: Subject to any disclaimer, the term of this patent is extended or adjusted under 35 U.S.C. 154(b) by 0 days.

(21) Appl. No.: 15/837,764

(22) Filed: Dec. 11, 2017

(65) Prior Publication Data

US 2018/0165483 A1 Jun. 14, 2018

Related U.S. Application Data

(60) Provisional application No. 62/432,439, filed on Dec. 9, 2016.

(51) Int. Cl.
*G06K 7/10* (2006.01)
*G06Q 10/00* (2012.01)

(52) U.S. Cl.
CPC ......... *G06K 7/10366* (2013.01); *G06Q 10/00* (2013.01)

(58) Field of Classification Search
CPC ........... G06K 7/10366; G06K 7/10009; G06K 19/0723; G06K 7/10316; G06K 7/10356; G06K 7/0008; G06K 19/0717
USPC ....................................................... 340/10.1
See application file for complete search history.

(56) References Cited

U.S. PATENT DOCUMENTS

| | | | |
|---|---|---|---|
| 5,483,624 A | 1/1996 | Christopher et al. | |
| 5,726,431 A | 3/1998 | VanDonkelaar et al. | |
| 6,007,759 A | 12/1999 | Ten Tije et al. | |
| 6,379,058 B1 | 4/2002 | Petteruti et al. | |
| 6,409,401 B1 | 6/2002 | Petteruti et al. | |
| 6,982,640 B2 | 1/2006 | Lindsay et al. | |
| 7,180,627 B2 | 2/2007 | Moylan et al. | |
| 7,196,625 B1 * | 3/2007 | Nguyen ................. | F25D 29/00 340/3.1 |
| 7,737,855 B2 * | 6/2010 | Rubinstein ............ | G06Q 50/12 340/545.6 |
| 8,077,041 B2 | 12/2011 | Stern et al. | |

(Continued)

FOREIGN PATENT DOCUMENTS

| | | |
|---|---|---|
| CN | 101354740 A | 1/2009 |
| WO | 2016036015 A1 | 3/2016 |

OTHER PUBLICATIONS

International Search Report and Written Opinion dated May 14, 2018 in corresponding PCT application No. PCT/IB2017/001676.

*Primary Examiner* — Mark S Blouin
(74) *Attorney, Agent, or Firm* — Gearhart Law, LLC

(57) ABSTRACT

Systems and methods are provided for reading radio frequency identification (RFID) tags in a refrigeration unit and transmitting and analyzing RFID information is provided. The method includes scanning a refrigeration unit, using an RFID reader, for one or more products, each of the one or more products being tagged with an RFID tag, collecting, using the RFID reader, information from the RFID tag for each of the one or more products, transmitting the information to one or more remote servers, analyzing the information, using the one or more remote servers, and accessing the analyzed information using one or more remote electronic devices.

20 Claims, 2 Drawing Sheets

(56) References Cited

U.S. PATENT DOCUMENTS

| | | | |
|---|---|---|---|
| 9,208,520 B2* | 12/2015 | Brown | G06Q 10/087 |
| 9,449,208 B2* | 9/2016 | Luk | F25D 29/005 |
| 9,495,851 B1* | 11/2016 | Russell | G06Q 10/00 |
| 9,691,114 B2* | 6/2017 | Ashrafzadeh | G06F 19/3462 |
| 2006/0221363 A1 | 10/2006 | Roth et al. | |
| 2007/0023516 A1 | 2/2007 | Chapman et al. | |
| 2007/0075832 A1 | 4/2007 | Morse et al. | |
| 2008/0046345 A1 | 2/2008 | Serre | |
| 2012/0260683 A1 | 10/2012 | Cheon et al. | |
| 2013/0270341 A1 | 10/2013 | Janneh | |
| 2015/0174803 A1 | 6/2015 | Newman et al. | |
| 2016/0140526 A1* | 5/2016 | Cummins | G06Q 10/08 705/28 |
| 2017/0157824 A1 | 6/2017 | Ward et al. | |

* cited by examiner

SYSTEM AND METHOD, USING COOLERS, FOR READING RADIO FREQUENCY IDENTIFICATION TAGS AND TRANSMITTING DATA WIRELESSLY

CLAIM OF PRIORITY

This application claims priority to U.S. Provisional Patent Application No. 62/432,439, filed Dec. 9, 2016, incorporated by reference herein in its entirety.

FIELD OF THE EMBODIMENTS

This invention relates to identification tag readers and, in particular, to radio frequency identification (RFID) reader assemblies that have internal management capability to scan adjacent products and transmit inventory identifications (IDs) to one or more secondary devices.

BACKGROUND OF THE EMBODIMENTS

Much of the food purchased for home use is stored in refrigeration units (e.g., refrigerators and freezers). However, since these refrigeration units must be opened and searched through in order to readily see the expiration dates and other information about the products stored therein, the expiration dates and other relevant dates for products stored in refrigeration units often goes unchecked. This leads to food waste and the possibility of sicknesses due to consuming expired and/or spoiled foods.

For at least these reasons, a system and method is thus needed that can readily read information on home refrigerated products and transmit this information to one or more secondary devices. Such a system and method can be used to reduce food waste that is related to product expiry and can be used more generally to control household food inventory.

Examples of related art are described below:

U.S. Pat. No. 8,077,041 describes a system for tracking store-items placed in a storage space. The system includes a plurality of wireless RFID readers distributed within the storage space such that at least one store-item, having an RFID tag attached, is within an interrogation range of at least one of the wireless RFID reader. The system further includes a monitoring server operative to communicate wirelessly with the a plurality of wireless RFID readers to obtain information collected by the plurality of wireless RFID readers from the RFID tag attached to the at least one store-item.

None of the art described above addresses all of the issues that the present invention does.

SUMMARY OF THE EMBODIMENTS

According to an aspect of the present invention, a method for reading radio frequency identification (RFID) tags in a refrigeration unit and transmitting and analyzing RFID information is provided. The method includes scanning a refrigeration unit, using an RFID reader, for one or more products, each of the one or more products being tagged with an RFID tag, collecting, using the RFID reader, information from the RFID tag for each of the one or more products, transmitting the information to one or more remote servers, analyzing the information, using the one or more remote servers, and accessing the analyzed information using one or more remote electronic devices.

It is an object of the present invention to provide the method for reading RFID tags in a refrigeration unit and transmitting and analyzing RFID information, wherein the method further includes further analyzing the analyzed data using one or more remote data servers.

It is an object of the present invention to provide the method for reading RFID tags in a refrigeration unit and transmitting and analyzing RFID information, wherein the method further includes sending, using the one or more remote data servers, one or more alerts to one or more users based on the further analysis of the information.

It is an object of the present invention to provide the method for reading RFID tags in a refrigeration unit and transmitting and analyzing RFID information, wherein the method further includes selecting a preferred method in which the one or more alerts are sent.

It is an object of the present invention to provide the method for reading RFID tags in a refrigeration unit and transmitting and analyzing RFID information, wherein the information is selected from the group consisting of: product name; packaging date; sell-by date; expiration date; and supply.

It is an object of the present invention to provide the method for reading RFID tags in a refrigeration unit and transmitting and analyzing RFID information, wherein the one or more remote electronic devices are selected from the group consisting of: a desktop computer; a laptop computer; a tablet computer; and a smart phone.

It is an object of the present invention to provide the method for reading RFID tags in a refrigeration unit and transmitting and analyzing RFID information, wherein the scanning the refrigeration unit further includes scanning the refrigeration unit at predetermined time intervals.

It is an object of the present invention to provide the method for reading RFID tags in a refrigeration unit and transmitting and analyzing RFID information, wherein the method further includes determining the time intervals over which the RFID reader scans the refrigeration unit.

It is an object of the present invention to provide the method for reading RFID tags in a refrigeration unit and transmitting and analyzing RFID information, wherein the transmitting is performed using a wireless transmission method.

It is an object of the present invention to provide the method for reading RFID tags in a refrigeration unit and transmitting and analyzing RFID information, wherein the wireless transmission method is selected from the group consisting of: WiFi; and Bluetooth low energy transmission.

According to another aspect of the present invention, a system for reading RFID tags in a refrigeration unit and transmitting and analyzing RFID information is provided. The system includes an RFID reader, configured to scan a refrigeration unit for one or more products, each of the one or more products being tagged with an RFID tag, and collect information from the RFID tag for each of the one or more products. The system further includes a transmitter configured to transmit the information to one or more remote server, the one or more remote servers configured to analyze the information, and one or more remote electronic devices configured to access the analyzed information.

It is an object of the present invention to provide the system for reading RFID tags in a refrigeration unit and transmitting and analyzing RFID information, wherein the system further includes one or more remote data servers configured to further analyze the analyzed data.

It is an object of the present invention to provide the system for reading RFID tags in a refrigeration unit and transmitting and analyzing RFID information, wherein the one or more remote data servers are further configured to send one or more alerts to one or more users based on the further analysis of the information.

It is an object of the present invention to provide the system for reading RFID tags in a refrigeration unit and transmitting and analyzing RFID information, wherein the one or more remote electronic devices are configured to enable a user to select a preferred method in which the one or more alerts are sent.

It is an object of the present invention to provide the system for reading RFID tags in a refrigeration unit and transmitting and analyzing RFID information, wherein the information is selected from the group consisting of: product name; packaging date; date; expiration date; and supply.

It is an object of the present invention to provide the system for reading RFID tags in a refrigeration unit and transmitting and analyzing RFID information, wherein the one or more remote electronic devices are selected from the group consisting of: a desktop computer; a laptop computer; a tablet computer; and a smart phone.

It is an object of the present invention to provide the system for reading RFID tags in a refrigeration unit and transmitting and analyzing RFID information, wherein the RFID reader is configured to scan the refrigeration unit by scanning the refrigeration unit at predetermined time intervals.

It is an object of the present invention to provide the system for reading RFID tags in a refrigeration unit and transmitting and analyzing RFID information, wherein the RFID reader further includes at least one processor and at least one memory.

It is an object of the present invention to provide the system for reading RFID tags in a refrigeration unit and transmitting and analyzing RFID information wherein the wherein the transmitter is configured to perform a wireless transmission method.

It is an object of the present invention to provide the system for reading RFID tags in a refrigeration unit and transmitting and analyzing RFID information, wherein the wireless transmission method is selected from the group consisting of: WiFi; and Bluetooth low energy transmission.

DESCRIPTION OF THE PREFERRED EMBODIMENTS

Figure 1:
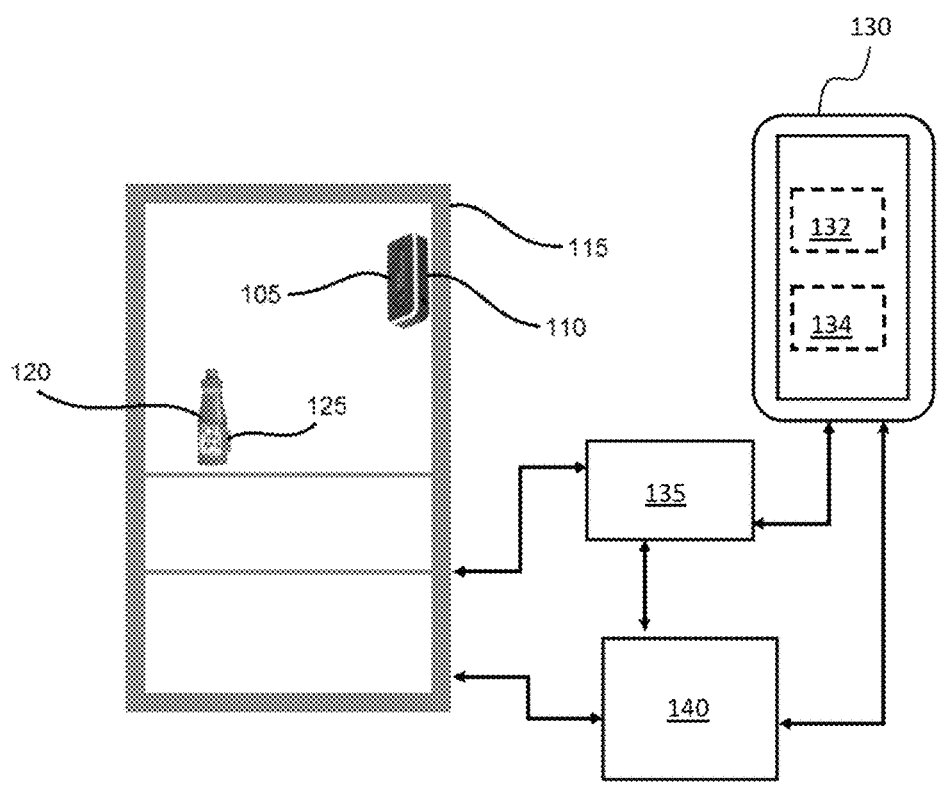
FIG. 1 shows an RFID reading and information transmitting system, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

According to an embodiment, a system and method is provided which can be used to reduce food waste that is related to product expiry and can be used more generally to control household food inventory.

Referring, now to FIG. 1, an RFID reading and information transmitting system 100 is illustratively depicted, in accordance with an embodiment of the present invention.

According to an embodiment, the suggested system 100 includes two parts assembled together. According to an embodiment, the first part includes an RFID reader 105 that includes a scheduler for its operation. According to an embodiment, the system 100 is configured such that a consumer can change the scanning interval of the scheduler. According to an embodiment, the RFID reader 105 further includes at least one processor and/or memory.

According to an embodiment, the second part includes a transmitting apparatus 110, the system is configured such that the user is enabled to choose a transmitting method to be used. According to an embodiment, the transmitting method is a wireless method (e.g., WiFi, Bluetooth low energy (BLE), and/or any other suitable wireless transmission method). According to an embodiment, the transmitting method includes a wired method. According to an embodiment, WiFi and BLE are preferred methods for data transfer. It is noted, however, that other methods of data transfer may also be used, while maintaining the spirit of the present invention. According to an embodiment, the transmitting apparatus 110 may be a transmitter and/or a transceiver.

According to an embodiment, the system includes a refrigeration unit 115 (e.g., a refrigerator, a freezer, and/or any other suitable refrigeration apparatus). According to an embodiment, the refrigeration unit 115 is configured to act as a food storage container.

According to an embodiment, the refrigeration unit is configured to house one or more food products 120. According to an embodiment, one or more of the one or more food products 120 includes an RFID tag 125. According to an embodiment, the one or more food products 120 receive RFID tags 125 prior to being stored in the refrigeration unit 115. This tagging process may be done, e.g., on a production line, at retailers, and/or at any other suitable time and using any suitable method of tagging the one or more products 120.

An example method of placing RFID tags on one or more products 120 to be stored in a refrigeration unit 115 may include incorporating a system that includes two parts. According to an embodiment, the first part includes an injection valve that injects a mix of polycaprolactone (or other low melting point plastic or other suitable material) and glue on containers configured to hold one or more liquids (e.g., dairy products packages). According to an embodiment, the injected mix is poured in discrete quantities in a way that enables approximately 2-5 millimeters spacing between the container (e.g., a dairy product package) and a passive RFID tag. According to an embodiment, this spacing is crucial in order to create an isolation layer between the RFID tag and the wet mass inside the package in order to enable tag ability to respond. According to an embodiment, the second part of this invention is the method to attach the RFID label on the already injected mix.

According to an embodiment, the RFID tagging system is based on an approach to combine low melting point plastic with possible adhesive together with accurate plastic injection tool. This will be used to create few millimeters 'spacing' that can separate the wet mass inside dairy food package and passive RFID tag has frequency between 860 MHz AND 960 MHz. This separation is needed for the tag to react to any remote reader or writer.

According to an embodiment, the RFID reader 105 and transmitting apparatus 110 are coupled to an inner surface of the refrigeration unit 115. According to an embodiment, the RFID reader 105 is configured to read information from one or more products 120 having RFID tags 125 positioned thereon and housed in the refrigeration unit 115. This information may include information such as, e.g., product name, packaging date, sell-by date, expiration date, supply in the refrigeration unit 115, and/or any other suitable information.

According to an embodiment, the communication transmitting apparatus 110 is configured to transmit all or some of this information to one or more secondary devices 130. According to an embodiment, these one or more secondary devices 130 may include, e.g., a desktop computer, a laptop computer, a tablet computer, a smart phone, and/or any other suitable electronic device. According to an embodiment, this information is transmitted to the one or more electronic devices 130 in real time. This enables the consumer to manage food waste and food inventory in real time and in a smarter way than previous systems and methods, thus improving upon the existing technologies.

According to an embodiment, the system 100 further includes one or more remote servers 135 coupled to the transmitting apparatus 110 via a wired and/or wireless connection. According to an embodiment, the one or more remote servers 135 are configured to aggregate and analyze any metadata received from one or more refrigeration units 115 and/or one or more food items 120. According to an embodiment, once the one or more remote servers 135 aggregate and analyze the metadata, the one or more remote servers can then globally use the data to reduce household food waste and manage food inventory.

According to an embodiment, the user may access one or more pieces of data from the one or more remote servers 135 using the one or more secondary devices 130. According to an embodiment, the user uses a digital application on the one or more secondary devices 130 to access the information from the one or more remote servers 135. According to an embodiment, the user may use the digital application to view information that reflects food freshness and that enables users to manage existing or missing inventory.

According to an embodiment, the system 100 may further include one or more data servers 140 configured to receive, aggregate, and analyze the data from any endpoints located in home fridges 115. The one or more data servers 140 may then use the data to alert users for products 120 that are running out and/or products 120 that are close to being expired.

Figure 2:
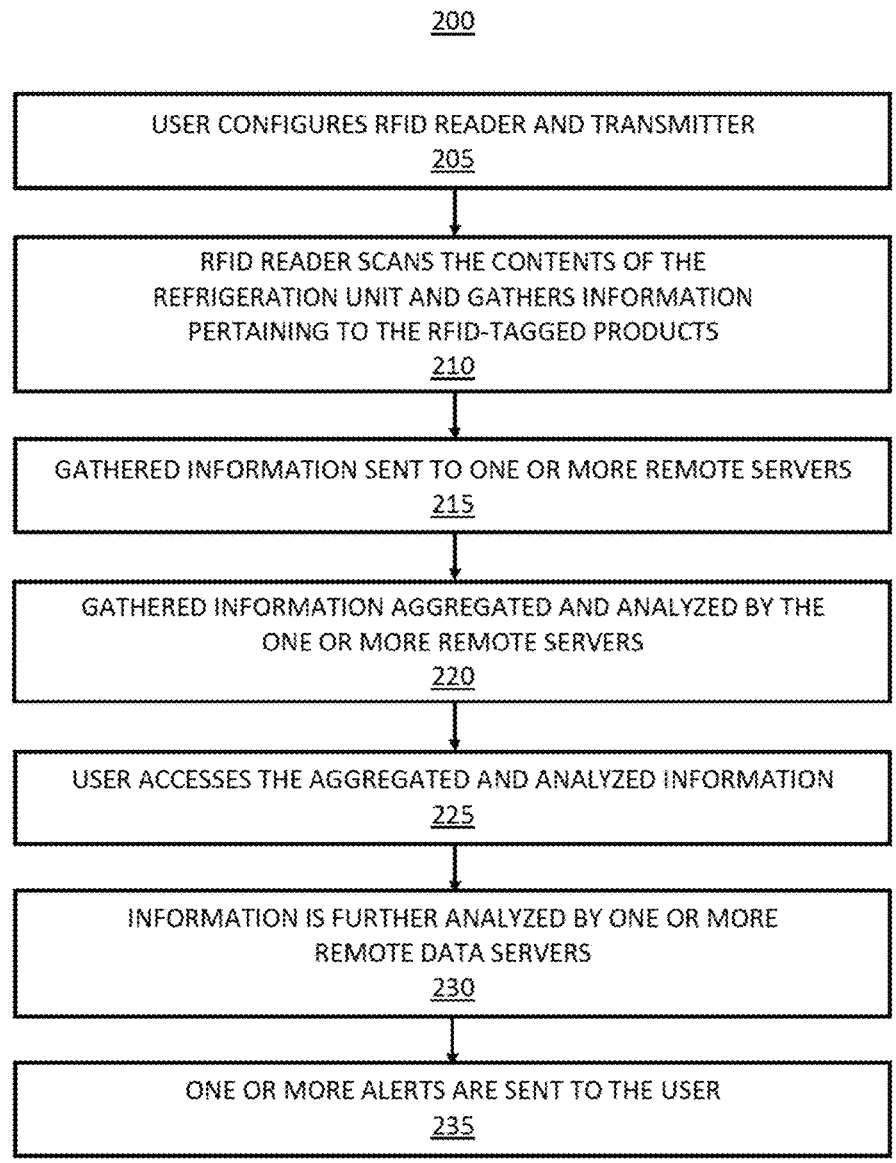
FIG. 2 shows a method for reading one or more RFID tags and transmitting information from the one or more RFID tags, according to an embodiment of the present invention.

Referring now to FIG. 2, a method 200 for reading one or more RFID tags 125 and transmitting information from the one or more RFID tags 125 is illustratively depicted, in accordance with an embodiment of the present invention.

At step 205, a user configures the RFID reader 105 and the transmitter 110. According to an embodiment, the user configuration includes defining any automatic scanning intervals. According to an embodiment, the user configuration includes defining a preferred communication method. The preferred communication method may be email, text messaging, digital application notification, and/or any other suitable notification method.

At step 210, the RFID reader 105 scans the contents of the refrigeration unit 115 and gathers information from one or more products 120 in the refrigeration unit that include an RFID tag 125. According to an embodiment, the RFID reader 105 scans the contents of the refrigeration unit 115 in intervals configured when the user configured the RFID reader 105. According to an embodiment, the information gathered during the scan is stored in the memory of the RFID scanner 105 prior to being transmitted to the one or more remote servers 135.

At step 215, the data gathered by the RFID reader 105 is transmitted to the one or more remote servers 135 where, at step 220, the data is aggregated and analyzed. According to an embodiment, the data is transmitted to the one or more remote servers 135 via a wired and/or wireless connection (e.g., WiFi, BLE, etc.).

At step 225, the user accesses the aggregated and analyzed data. According to an embodiment, the user accesses the data using one or more secondary electronic devices 130. According to an embodiment, the one or more secondary electronic devices may each include one or more processors 134 and/or one or more memories 136.

At step 230, data from the RPM reader 105 and/or the one or more remote servers 135 is analyzed by one or more data servers 140. According to an embodiment based on the analysis by the one or more data servers 140, at step 235, one or more alerts may be sent to one or more users on the one or more secondary electronic devices 130. According to an embodiment, the one or more remote servers 135 and the one or more data servers 140 are the same servers. According to an embodiment, the one or more remote servers 135 and the one or more remote data servers 140 are separate servers.

The present system and method may be used with a variety of products. For example, according to an embodiment, a white cheese package 120 previously tagged with an RFID label 125 may be placed inside of a home fridge 115. According to an embodiment, the RFID reader 105 reads the expiration date of the product 120 automatically every set amount of minutes and transmits the data, as is, to a remote server 135 that holds product meta data. The data is then pushed through a user's mobile application to the user. Such data can be, e.g., "you have chocolate milk that is about to be expired, drink it or donate it", and/or any other suitable data.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for reading radio frequency identification (RFID) tags in a refrigeration unit and transmitting and analyzing RFID information, comprising:

scanning a refrigeration unit, using an RFID reader mounted within the refrigeration unit, for one or more products, each of the one or more products being tagged with an RFID tag;

collecting, using the RFID reader, information from the RFID tag for each of the one or more products;

transmitting the information to one or more remote servers;

analyzing the information, using the one or more remote servers; and accessing the analyzed information using one or more remote electronic devices.

2. The method as recited in claim 1, further comprising: further analyzing the analyzed data using one or more remote data servers.

3. The method as recited in claim 2, further comprising: sending, using the one or more remote data servers, one or more alerts to one or more users based on the further analysis of the information.

4. The method as recited in claim 3, further comprising: selecting a preferred method in which the one or more alerts are sent.

5. The method as recited in claim 1, wherein the information is selected from the group consisting of product name; packaging date; sell-by date; expiration date; and supply.

6. The method as recited in claim 1, wherein the one or more remote electronic devices are selected from the group consisting of: a desktop computer; a laptop computer; a tablet computer; and a smart phone.

7. The method as recited in claim 1, wherein the scanning the refrigeration unit further includes scanning the refrigeration unit at predetermined time intervals.

8. The method as recited in claim 7, further comprising: determining the time intervals over which the RFID reader scans the refrigeration unit.

9. The method as recited in claim 1, wherein the transmitting is performed using a wireless transmission method.

10. The method as recited in claim 9, wherein the wireless transmission method is selected from the group consisting of WiFi; and Bluetooth low energy transmission.

11. A system for reading radio frequency identification (RFID) tags in a refrigeration unit and transmitting and analyzing RFID information, comprising:
an RFID reader, configured to:
scan a refrigeration unit for one or more products, each of the one or more products being tagged with an RFID tag; and
collect information from the RFID tag for each of the one or more products; a transmitter configured to transmit the information to one or more remote servers; the one or more remote servers configured to analyze the information, wherein the RFID reader is mounted within the refrigeration unit; and
one or more remote electronic devices configured to access the analyzed information.

12. The system as recited in claim 11, further comprising: one or more remote data servers configured to further analyze the analyzed data.

13. The system as recited in claim 12, wherein the one or more remote data servers are further configured to send one or more alerts to one or more users based on the further analysis of the information.

14. The system as recited in claim 13, wherein the one or more remote electronic devices are configured to enable a user to select a preferred method in which the one or more alerts are sent.

15. The system as recited in claim 11, wherein the information is selected from the group consisting of product name, packaging date; sell-by date; expiration date; and supply.

16. The system as recited in claim 1, wherein the one or more remote electronic devices are selected from the group consisting of: a desktop computer; a laptop computer; a tablet computer, and a smart phone.

17. The system as recited in claim 1, wherein the RFID reader is configured to scan the refrigeration unit by scanning the refrigeration unit at predetermined time intervals.

18. The system as recited in claim 17, further comprising wherein the RFID reader further includes at least one processor and at least one memory.

19. The system as recited in claim 11, wherein the wherein the transmitter is configured to perform a wireless transmission method.

20. The system as recited in claim 19, wherein the wireless transmission method is selected from the group consisting of WiFi; and Bluetooth low energy transmission.

* * * * *